(12) United States Patent
Muff et al.

(10) Patent No.: US 8,326,904 B2
(45) Date of Patent: Dec. 4, 2012

(54) TRIGONOMETRIC SUMMATION VECTOR EXECUTION UNIT

(75) Inventors: Adam J. Muff, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 12/360,243

(22) Filed: Jan. 27, 2009

(65) Prior Publication Data
US 2010/0191939 A1 Jul. 29, 2010

(51) Int. Cl.
*G06F 1/02* (2006.01)
(52) U.S. Cl. .................................................. 708/276

(58) Field of Classification Search ............ 708/208, 708/276, 440, 444
See application file for complete search history.

(56) References Cited

U.S. PATENT DOCUMENTS

| | | | |
|---|---|---|---|
| 7,509,363 B2 * | 3/2009 | Clifton | 708/277 |
| 8,190,669 B1 * | 5/2012 | Oberman et al. | 708/523 |
| 2008/0183783 A1 * | 7/2008 | Tubbs | 708/209 |
| 2009/0070398 A1 * | 3/2009 | Mejdrich et al. | 708/440 |

* cited by examiner

*Primary Examiner* — Chuong D Ngo
(74) *Attorney, Agent, or Firm* — Jim Boice

(57) ABSTRACT

A unique instruction and exponent adjustment adder selectively shift outputs from multiple execution units, including a plurality of multipliers, in a processor core in order to scale mantissas for related trigonometric functions used in a vector dot product.

10 Claims, 8 Drawing Sheets

| cycle 1 | cycle 2 | cycle 3 | cycle 4 | cycle 5 | cycle 6 | cycle 7 | cycle 8 | cycle 9 | cycle 10 | cycle 11 | cycle 12 | cycle 13 |
|---|---|---|---|---|---|---|---|---|---|---|---|---|
| A1 | | | | | | | | | | | | |
| | A1 | | | | | | | | | | | |
| | | A1 | | | | | | | | | | |
| | | | A1 | | | | | | | | | |
| stall | stall | stall | stall | B1 | | | | | | | | |
| | | | | | B1 | | | | | | | |
| | | | | | | B1 | | | | | | |
| | | | | | | | B1 | | | | | |
| stall | stall | stall | stall | stall | stall | stall | stall | C1 | A2 | | | |
| | | | | | | | | | C1 | A2 | | |
| | | | | | | | | | | C1 | A2 | |
| | | | | | | | | | | | C1 | A2 |
| | | | | | | | | | | | | |

| cycle 1 | cycle 2 | cycle 3 | cycle 4 | cycle 5 | cycle 6 | cycle 7 | cycle 8 | cycle 9 | cycle 10 | cycle 11 |
|---|---|---|---|---|---|---|---|---|---|---|
| A1 | | | | | | | | | | |
| | A1 | | | | | | | | | |
| | | A1 | | | | | | | | |
| | | | A1 | | | | | | | |
| stall | stall | stall | stall | B1 | | | | | | |
| | | | | | B1 | A2 | | | | |
| | | | | | | B1 | A2 | | | |
| | | | | | | | B1 | A2 | | |
| | | | | | | | | B1 | A2 | |
| | | | | | | | | | B1 | ... |

502

TRIGONOMETRIC SUMMATION VECTOR EXECUTION UNIT

BACKGROUND OF THE INVENTION

1. Technical Field

The present disclosure relates to the field of computers, and specifically to vector processing. Still more particularly, the present disclosure relates to scaling vector dot products, including, but not limited to, trigonometric-based vector dot products.

2. Description of the Related Art

In many areas of computing, a common calculation occurs where a sum must be obtained of several results from trigonometric operations. Some of these applications include real time physics simulations in games or obtaining a relatively accurate numerical approximation of the integral of a trigonometric function by numerical integration. The following equation shows the equation for performing numerical integration using the rectangle rule:

$$\int_a^b f(x)\,dx \approx \sum_{i=1}^{n} f(a + i\Delta x)\Delta x$$

$$\Delta x = \frac{b-a}{n}$$

For a sin( ) function, this equation becomes:

$$\int_a^b \mathrm{Sin}(x)\,dx \approx \sum_{i=1}^{n} \mathrm{Sin}(a + i\Delta x)\Delta x$$

$$\Delta x = \frac{b-a}{n}$$

The graph of this sine function is shown in FIG. 1 as graph 102.

If using current scalar instructions and a numerical integration operation with n=16, integrating from a=0 to b=2pi results in the following instructions being issued 16 times, as shown in the following assembly language pseudocode:

```
a: fadd    x, x, dx       # get the next x
b: fsin    y, x           # obtain the result of the function at x
c: fmadd sum, sum, dx, y  # scale and add to the running sum
```

For simplicity, this is assumed to be not in a loop, where the following sequence is just repeated 16 times. However, if this sequence were in a loop, the performance would be worse than shown. That is, assuming a floating point pipeline latency of four cycles for each of the above dependent instructions, the example would take (9*16)+4=148 cycles to complete.

In the previous example, due to the inter-instruction dependency between the first add instruction (An) and the sine instruction (Bn), and then the sine instruction and the multiply add instruction (Cn), one iteration of the summation consumes nine cycles of latency. This is due to the fact that the fadd for the next iteration (An+1) can start down the pipeline in the next cycle after the previous fmadd is issued, a seen in the chart 202 in FIG. 2. Then, the last add instruction in the summation must be allowed to complete, which accounts for the additional four cycles. In addition, note that valuable temporary registers must be used (y) in this process.

SUMMARY OF THE INVENTION

In order to address the issues described above, a unique instruction and exponent adjustment adder selectively shift outputs from multiple execution units, including a plurality of multipliers, in a processor core in order to scale mantissas for related trigonometric functions used in a vector dot product.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates a cycle chart for steps taken to perform the numerical integration shown in FIG. 1;

DETAILED DESCRIPTION OF THE PREFERRED EMBODIMENT

Figure 3:
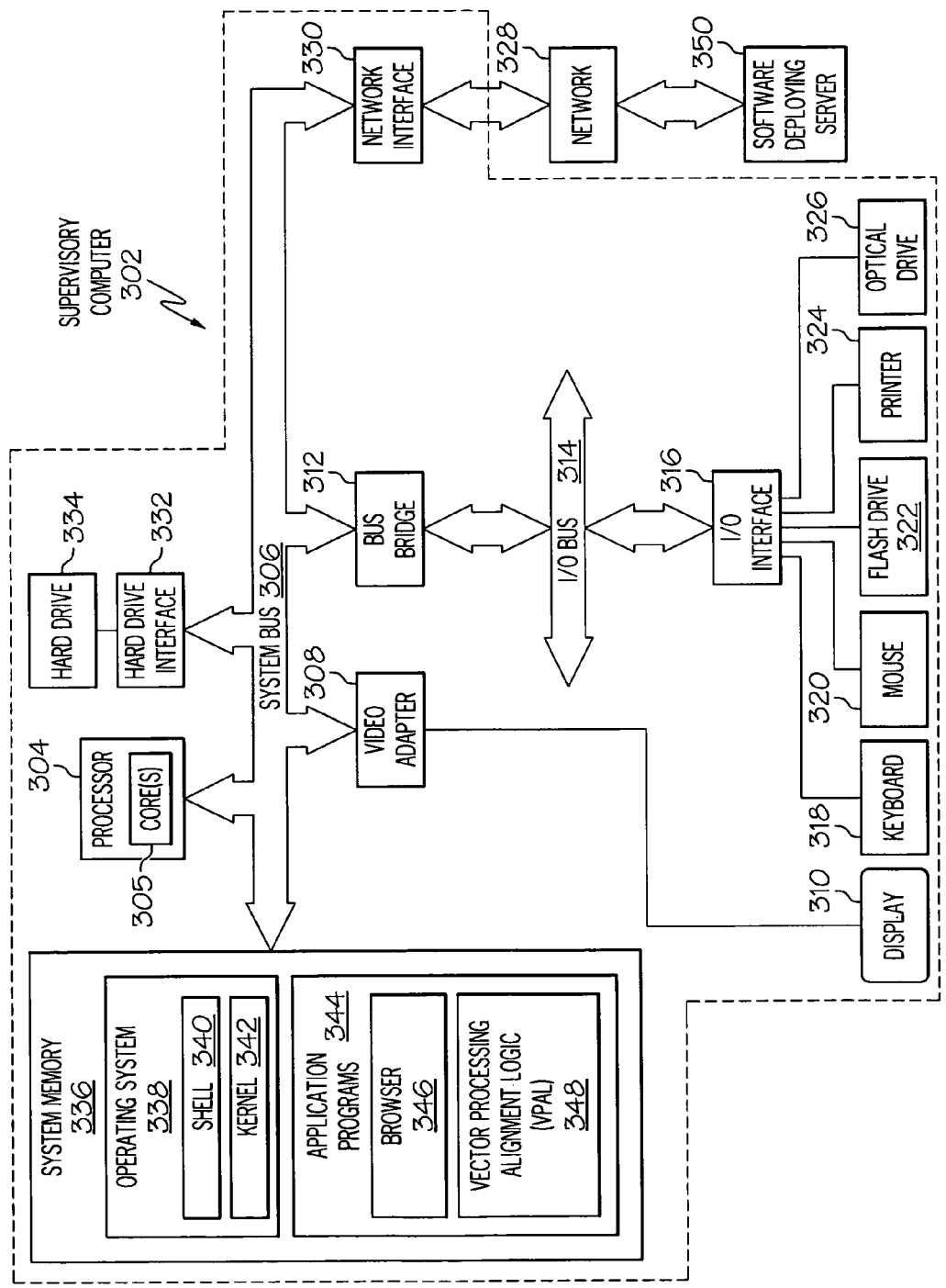
FIG. 3 depicts an exemplary computer in which the present invention may be implemented.

With reference now to FIG. 3, there is depicted a block diagram of an exemplary computer 302, which the present invention may utilize. Note that some or all of the exemplary architecture shown for computer 302 may be utilized by software deploying server 350.

Computer 302 includes a processor unit 304, which may utilize one or more processors each having one or more processor cores 305, that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Flash Drive 322, a printer 324, and an optical drive 326 (e.g., a CD-ROM drive). The format of the ports connected to I/O interface 316 may be any known to those skilled in the art of computer architecture, including but not limited to Universal Serial Bus (USB) ports.

Computer 302 is able to communicate with a software deploying server 350 via network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in computer 302. This volatile memory includes additional higher levels of volatile memory (not shown), including, but not limited to, cache memory, registers and buffers. Data that populates system memory 336 includes computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a renderer, shown in exemplary manner as a browser 346. Browser 346 includes program modules and instructions enabling a World Wide Web (WWW) client (i.e., computer 302) to send and receive network messages to the Internet using HyperText Transfer Protocol (HTTP) messaging, thus enabling communication with software deploying server 350 and other described computer systems.

Application programs 344 in computer 302's system memory (as well as software deploying server 350's system memory) also include a Vector Processing Alignment Logic (VPAL) 348. VPAL 348 includes code for implementing the processes described below, and particularly as described in FIGS. 4-8. In one embodiment, computer 302 is able to download VPAL 348 from software deploying server 350, including in an on-demand basis. Note further that, in one embodiment of the present invention, software deploying server 350 performs all of the functions associated with the present invention (including execution of VPAL 348), thus freeing computer 302 from having to use its own internal computing resources to execute VPAL 348.

The hardware elements depicted in computer 302 are not intended to be exhaustive, but rather are representative to highlight essential components required by the present invention. For instance, computer 302 may include alternate memory storage devices such as magnetic cassettes, Digital Versatile Disks (DVDs), Bernoulli cartridges, and the like. These and other variations are intended to be within the spirit and scope of the present invention.

As described herein, a new circuit configuration is disclosed that utilizes a new instruction that obtains the trigonometric result for separate vector operands, scales these results by a power of two, and adds the results together. This is accomplished by a new configuration of circuitry added to an existing vector floating point pipeline as follows: The trigonometric results are obtained by methods well understood in the art. Thereafter, the results are passed to a leading zero anticipator (LZA) and normalizer, where an immediate value passed in from the instruction data contains an exponent adjustment value. This exponent adjustment value is added to the previous shift amount obtained by the LZA to create the normalized and adjusted exponent. The normalizer then shifts the mantissa of the trig results by the shift amount determined by the LZA. This allows the trig results to essentially be scaled by a power of two (by adjusting the exponent) during the process of normalization. The results from the normalizer are then forwarded to the dot product aligner and adder to produce a final sum.

Figure 4:
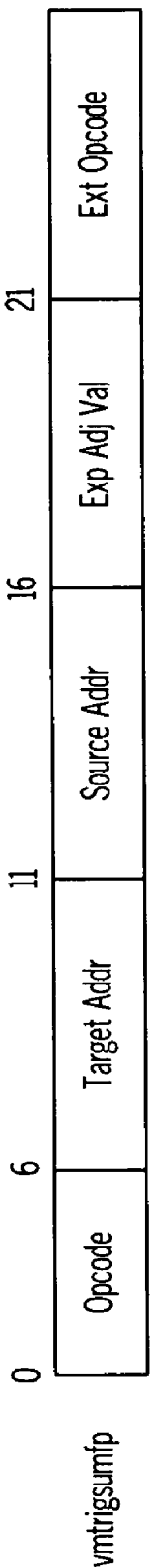
FIG. 4 illustrates a novel exemplary instruction that is used by the present invention to execute trigonometric summation in a processor core.
Figure 5:
FIG. 5 depicts a cycle chart for steps taken to perform an operation such as that described in FIGS. 1-2 but using the novel instruction shown in FIG. 4.

An example instruction format for this new instruction titled "vmtrigsumfp" is shown in FIG. 4 as instruction 402. Bits 0 to 5 of instruction 402 contain a primary opcode. This is used by instruction decoders to determine what operation to perform. The opcode held in bits 0 to 5 is used in conjunction with the extended opcode contained in bits 21 to 31. Bits 6 to 10 contain the address of the register in the register file where the results will be stored. Bits 11 to 15 contain the address of the source data. Bits 16 to 20 contain a signed immediate field that determines how much the result exponent of the trigonometric result will be adjusted, in effect multiplying each trig result by a power of two.

Figure 1:
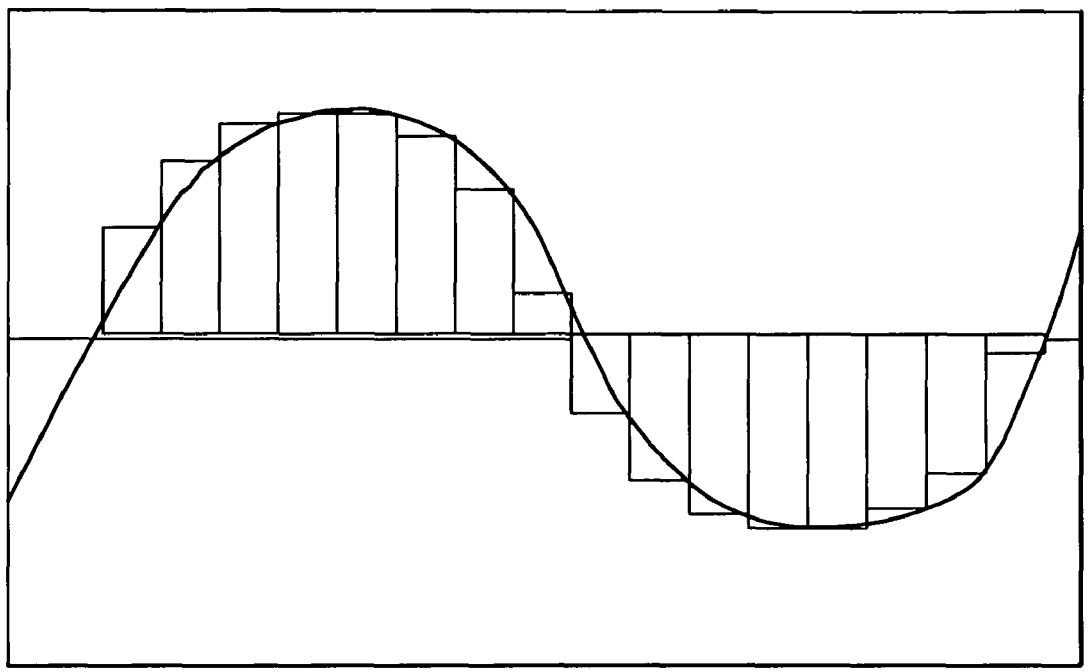
FIG. 1 depicts an exemplary trigonometric function being numerically integrated.

The results of the example algorithm described above in FIGS. 1-2 can then be achieved using the following pseudocode and the novel instruction 402 shown in FIG. 4:

```
# vx contains [0, dx, 2dx, 3dx]
# vdx contains [4dx, 4dx, 4dx, 4dx]
a1: vaddfp      vx, vx, vdx # get the next 4 vx's
b1: vmtrigsumfp vy.x, vx, 4 # obtain the 4 results of the function at x
a2: vaddfp      vx, vx, vdx # get the next 4 vx's
b2: vmtrigsumfp vy.y, vx, 4 # obtain the 4 results of the function at x
a3: vaddfp      vx, vx, vdx # get the next 4 vx's
b3: vmtrigsumfp vy.z, vx, 4 # obtain the 4 results of the function at x
a4: vaddfp      vx, vx, vdx # get the next 4 vx's
b4: vmtrigsumfp vy.w, vx, 4 # obtain the 4 results of the function at x
vdot            vy, vy, ones # add the final 4 intermediate sums
```

Using the example pseudocode just described, the vector trigonometric summation instruction takes six cycles to complete, so each iteration of the loop will take ten cycles. However the add instruction for the next iteration can start in cycle 7, so the first three iterations have a latency of only six cycles, as described in table 502 in FIG. 5. Since each iteration sums four scaled trig results, only four iterations are needed to perform the example, in addition to a final dot product used to add the intermediate four sums. This results in the entire example taking (3*6)+4+6=28 cycles, which is substantially faster than the prior art described in FIGS. 1-2.

Figure 6:
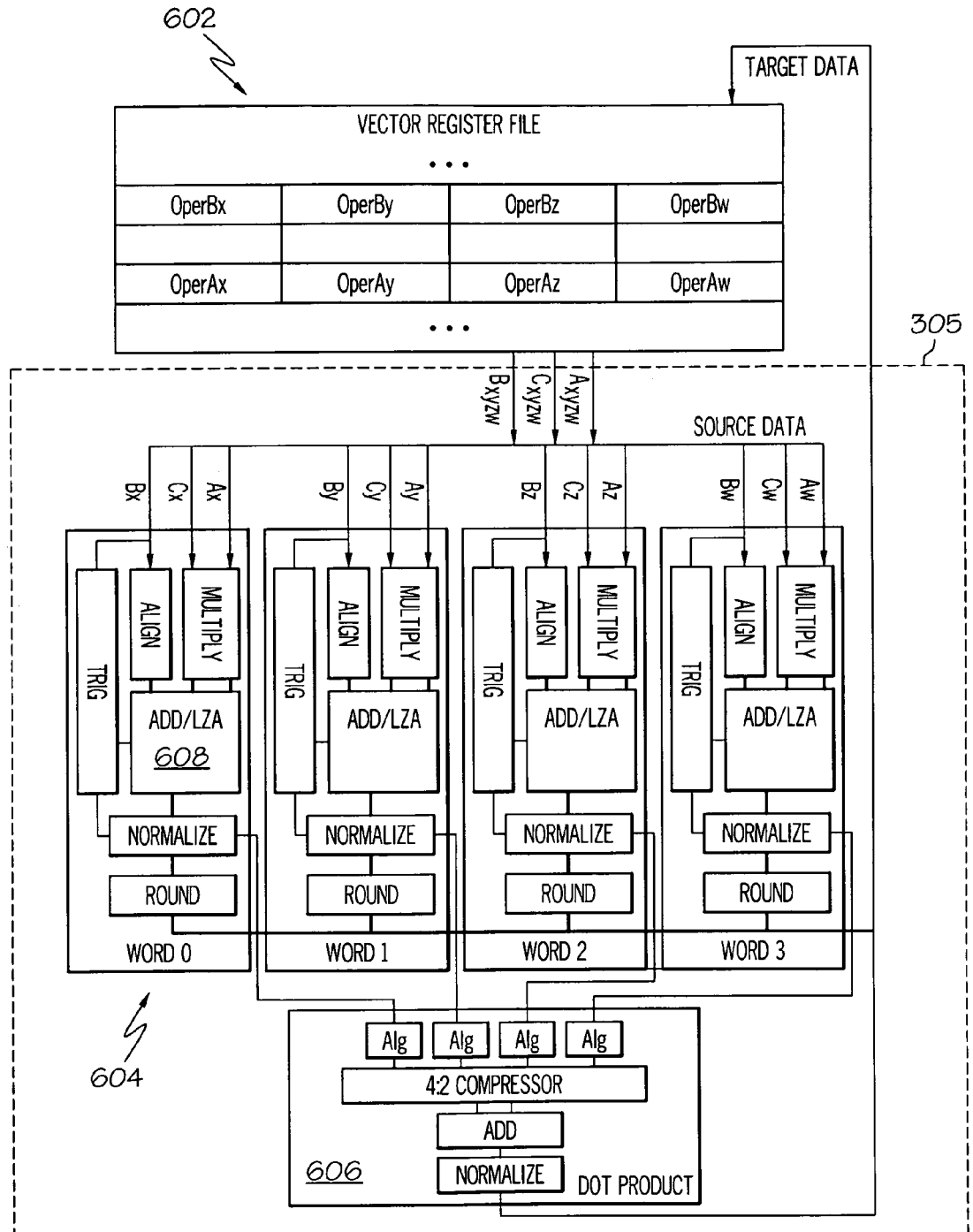
FIG. 6 illustrates additional detail of a processor core introduced in FIG. 3.

Referring now to FIG. 6, additional detail of a processor core 305 (introduced in FIG. 3) and a data flow through the processor core 305 is presented. Note that operands from a vector register file 602 pass through multiple execution units 604. In accordance with the present invention, data flows from the vector register file 602 (e.g., operands) through trig execution units (described in greater detail below). The outputs of the trig units are normalized according to outputs of leading zero anticipators (LZA) and their normalized exponents adjusted by adding with the predetermined exponent adjust values found in special instructions (e.g., the instruction 402 shown in FIG. 4). The normalized and scaled outputs from the trig execution units are then sent to a dot product logic 606, in which they are used as operands for a dot product operation, where the results are added together.

Figure 7:
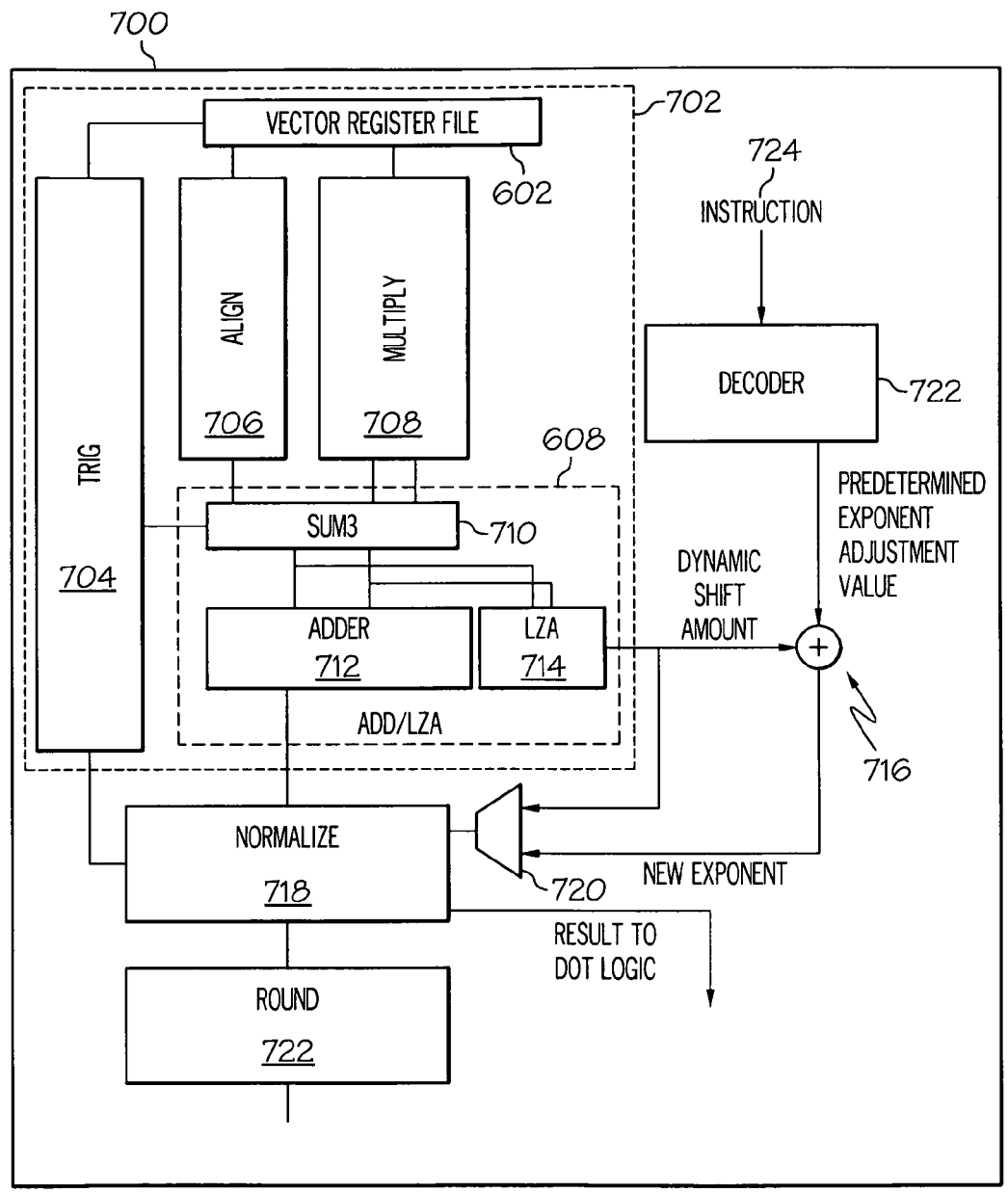
FIG. 7 depicts additional detail of the processor core shown in FIG. 6.

Additional detail of one of the execution units 604 is presented in FIG. 7 as execution unit 700. Within execution unit 700 is a vector floating point execution unit 702, which is able to process data vectors, including the calculation of intermediate dot products and/or scalars. Also within execution unit 700 is a trigonometric function block 704, which is able to determine trigonometric values of data from a vector operand. For example, assume that the instruction 402 shown in FIG. 4 is used to compute a value of sine for some datapoint between zero and pi. Trigonometric function block 704 can use a lookup table (not shown) or computational logic (also not shown) to determine what the value is for sin(x), where "x" is some value between zero and pi.

Vector floating point execution unit 702 also includes an aligner 706 that aligns operands for addition with outputs of multiple multipliers 708 according to their exponents. That is, operands from vector register file 602 (introduced in FIG. 6 and deemed part of vector floating point execution unit 702) are aligned with the outputs of the multiple multipliers 708 by the aligner 706 so that an adder 712 can take aligned outputs from aligner 706 and outputs from multipliers 708 (buffered in summer 710) and add them together. A leading zero anticipator (LZA) 714 detects any zeros before a leading "1" in a mantissa of these outputs. Based on how many leading zeros are detected, a dynamic shift amount is output from the leading zero anticipator 714. Thus, the Add/LZA 608 (shown in FIG. 6 as well) includes the summer 710, adder 712, and LZA 714.

An exponent adjust amount adder 716 is coupled to the leading zero anticipator 714, a normalizer 718 (via a multiplexer 720), and a decoder 722. Exponent adjust amount adder 716 adds the dynamic shift amount from the LZA 714 with the predetermined exponent adjust amount provided from the instruction 724 (and decoded by decoder 722). This yields an adjusted new exponent, which scales the output of the trigonometric function block 704. The decoder 722 and multiplexer 720 are configured to provide the normal shift amount (e.g., the dynamic shift amount from the LZA 714) if the special instruction 724 is not decoded.

Note that the rounder 722 is used only if values calculated by the vector floating point execution unit 702 and/or trigonometric function block 704 are used without the special instruction (i.e., instruction 704) as described above. That is, if the special instruction is not performed, then these outputs are merely rounded to some predetermined level of precision (e.g., the next whole number, the next decimal place, etc.). Thus, the disclosed invention allows for significant performance gains over the prior art in any application where a sum of power of two scaled trigonometric results is desired.

Figure 8:
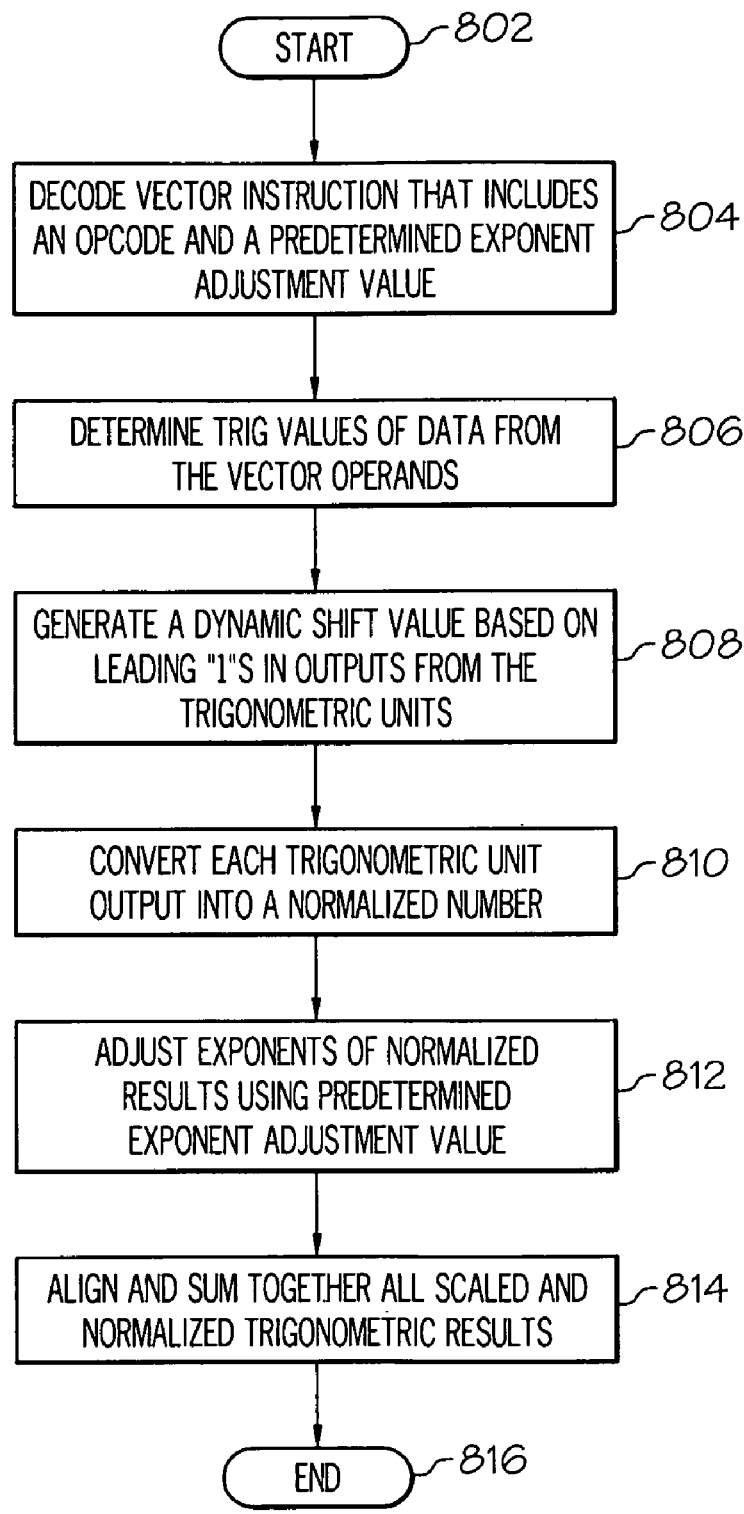
FIG. 8 is a high-level flow chart of steps taken to utilize the novel instruction and architecture described in FIGS. 4-7.

Referring now to FIG. 8, a high level flow chart of exemplary steps taken to perform trigonometric summation in a vector operation is presented. After initiator block 802, a vector instruction is decoded (block 804). This vector instruction includes not only normal opcode, but also a predetermined exponent adjustment value, which will be used to provide a predetermined additional level of scaling to a calculated trigonometric value.

Trigonometric values of data are determined from the vector operands (block 806). Most significant bits of vector trigonometric outputs include a mantissa having significant bits. Any zeros before a leading "1" in a mantissa of a trigonometric output is detected, such that the leading zero anticipator outputs a dynamic shift amount that is based on how many zeros are detected before a leading "1" for each output mantissa from the trigonometric outputs (block 808). Each trigonometric output is converted into a normalized number, wherein the normalized number has a leading "1" (block 810).

The exponents of the normalized trigonometric outputs are then adjusted by adding the predetermined exponent adjustment value with the normalized exponent (block 812). All of these results are then aligned and added together to produce a final sum (block 814). The process ends at terminator block 816.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

Furthermore, as used in the specification and the appended claims, the term computer or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer system comprising a processor core, wherein the processor core comprises:
    a decoder, wherein the decoder performs a decoding of a vector instruction that comprises an operation code and a predetermined exponent adjustment value;
    a vector floating point execution unit coupled to the decoder, wherein the vector floating point execution unit comprises:
        a register file configured to store vector operands,
        a trigonometric functional block for determining trigonometric values of data from the vector operands, and
        a leading zero anticipator for detecting any zeros before a leading "1" in a mantissa of a trigonometric functional block output, wherein the leading zero anticipator outputs a dynamic shift amount that is based on how many zeros are detected before a leading "1" for each output mantissa from the trigonometric functional block outputs;
    a normalizer for converting each trigonometric functional block output into a normalized number, wherein the normalized number has a leading "1"; and
    an exponent adjustment adder coupled to the decoder and the leading zero anticipator, wherein the exponent adjustment adder uses the predetermined exponent adjustment value and the dynamic shift amount to produce an adjusted result exponent for a trigonometric output from the trigonometric functional block.

2. The computer system of claim 1, further comprising:
a dot product logic coupled to the normalizer, wherein the dot product logic calculates a sum of the outputs from the trigonometric functional blocks.

3. The computer system of claim 1, further comprising:
a multiplexer coupled between the exponent adjustment adder and the normalizer, wherein the multiplexer selectively uses a first shift input or a second shift input to normalize the outputs from the trigonometric functional block, wherein the first shift input is a first shift amount that incorporates only the dynamic shift amount, and wherein the second shift input is a second shift amount that incorporates the predetermined exponent adjustment value and the dynamic shift amount.

4. A computer-implemented method of performing vector calculations using trigonometric functions and dot products, the method comprising:
decoding a vector instruction that comprises an operation code and a predetermined exponent adjustment amount value;
producing a trigonometric value using a trigonometric functional block, wherein each trigonometric functional block output includes a mantissa having significant bits;
detecting any zeros before a leading "1" in a mantissa of a trigonometric functional block output, wherein a leading zero anticipator outputs a dynamic shift amount that is based on how many zeros are detected before a leading "1" for each output mantissa from the trigonometric functional block outputs;
converting each trigonometric functional block output into a normalized number, wherein the normalized number has a leading "1";
utilizing the predetermined exponent adjustment amount value and the dynamic shift amount to produce a result exponent that scales the trigonometric value that is produced by the trigonometric functional block.

5. The method of claim 4, further comprising:
calculating a sum of the outputs from the trigonometric functional blocks.

6. The method of claim 5, further comprising:
using a multiplexer coupled between an exponent adjustment adder and a normalizer to selectively shift an output of the exponent adjustment adder using a first shift amount from the exponent adjustment adder or a second shift amount from the leading zero anticipator, wherein only the first shift amount incorporates the predetermined exponent adjustment amount value from the vector instruction.

7. A computer-readable storage medium on which is encoded a computer program, the computer program comprising computer executable instructions configured for:
decoding a vector instruction that comprises an operation code and a predetermined exponent adjustment amount value;
producing a trigonometric value using a trigonometric functional block, wherein each trigonometric functional block output includes a mantissa having significant bits;
detecting any zeros before a leading "1" in a mantissa of a trigonometric functional block output, wherein a leading zero anticipator outputs a dynamic shift amount that is based on how many zeros are detected before a leading "1" for each output mantissa from the trigonometric functional block outputs;
converting each trigonometric functional block output into a normalized number, wherein the normalized number has a leading "1";
utilizing the predetermined exponent adjustment amount value and the dynamic shift amount to produce a result exponent that scales the trigonometric value that is produced by the trigonometric functional block.

8. The computer-readable storage medium of claim 7, wherein the computer executable instructions are further configured for:
calculating a dot product of the outputs from the trigonometric functional block and an exponent adjustment adder.

9. The computer-readable storage medium of claim 7, wherein the computer executable instructions are further configured for:
using a multiplexer coupled between an exponent adjustment adder and a normalizer to selectively shift an output of the exponent adjustment adder using a first shift amount from the exponent adjustment adder or a second shift amount from the leading zero anticipator, wherein only the first shift amount incorporates the predetermined exponent adjustment amount value from the vector instruction.

10. A computer system comprising a processor core, wherein the processor core comprises:
a decoder, wherein the decoder performs a decoding of a vector instruction that comprises an operation code and a predetermined exponent adjustment amount value;
a trigonometric functional block for determining trigonometric values of data from vector operands;
a leading zero anticipator for detecting any zeros before a leading "1" in a mantissa of a determined trigonometric value, wherein the leading zero anticipator generates a dynamic shift amount; and
an exponent adjustment adder coupled to the decoder and the leading zero anticipator, wherein the exponent adjustment adder uses the predetermined exponent adjustment amount value and the dynamic shift amount to adjust a mantissa of a determined trigonometric value from the trigonometric functional block.

* * * * *